United States Patent [19]

Evans

[11] 3,991,035

[45] Nov. 9, 1976

[54] PROCESS FOR MODIFYING GLYCOL TEREPHTHALATE POLYESTERS TO CONTAIN CH₂—S OR CH₂—N LINKAGES

[75] Inventor: Evan Franklin Evans, Kinston, N.C.

[73] Assignee: E. I. Du Pont de Nemours and Company, Wilmington, Del.

[22] Filed: July 9, 1975

[21] Appl. No.: 594,358

[52] U.S. Cl. .......................... 260/75 T; 260/75 N; 260/75 S; 264/340; 264/343; 8/108 R; 8/DIG. 6
[51] Int. Cl.² .................. C08G 63/76; C08G 63/20
[58] Field of Search ............. 260/75 T, 75 N, 75 S; 264/340, 343; 8/DIG. 6, 108

[56] References Cited
UNITED STATES PATENTS

| | | |
|---|---|---|
| 2,647,104 | 7/1953 | Shivers..................... 260/75 N |
| 3,065,207 | 11/1962 | Andres..................... 260/75 N |
| 3,104,450 | 9/1963 | Christens et al............ 57/140 |
| 3,335,211 | 8/1967 | Mead et al................. 264/176 F |
| 3,823,117 | 7/1974 | Freudenberger et al. ..... 260/75 N |

*Primary Examiner*—Lucille M. Phynes

[57] ABSTRACT

Glycol terephthalate polyesters are modified to contain $CH_2-S$ or $CH_2-N$ linkages in molecular chains of the polyester, staple fibers of good strength are prepared from the modified polyesters, fabrics are prepared from the fibers and then treated with hypochlorous acid to develop pilling resistance. The treatment cleaves polyester molecules at the $CH_2-S$ or $CH_2-N$ links. Precise control is provided by the amount of modifier used and the relative viscosity of the fibers before the treatment.

6 Claims, No Drawings

PROCESS FOR MODIFYING GLYCOL TEREPHTHALATE POLYESTERS TO CONTAIN CH₂—S OR CH₂—N LINKAGES

BACKGROUND OF THE INVENTION

This invention relates to production of polyester fibers of linear glycol terephthalate polymers, and is more particularly concerned with a process for preparing modified fibers of good strength and subsequently developing predetermined pilling resistance properties after the fibers have been spun into yarn and knitted into fabric.

Polyester staple fibers have caused pilling problems in fabrics. Pilling refers to the accumulation on a fabric surface of numerous, unsightly, small balls of entangled fibers. The unsightly effect of pilling is not due so much to the formation of pills, which occurs on fabrics made from any staple fibers, but to the difficulty in wearing off the pills after they have formed. Thus, while high strength and abrasion resistance are desirable in polyester fabrics made from the continuous filaments, they are undesirable in staple fibers because they prevent rapid removal of pills during normal use of the fabrics. The problem is particularly severe in fabric knitted from spun staple yarns.

The pilling problem can be overcome by producing weak fibers. This is accomplished by lowering the relative viscosity. In general, polyester fibers exhibit little or no pilling when the fibers are about 8 to 12.5 relative viscosity ($RV_H$ as subsequently defined). Fibers of less than about 8 $RV_H$ are undesirably weak for most textile uses.

Production of polyester fibers becomes increasingly difficult as the relative viscosity is reduced. The melt viscosity of the polyester becomes so low that maintenance of product uniformity and continuity of spinning of the molten filaments without the formation of "drips" becomes a serious problem. A solution to this problem is to modify the polyester with an oxysilicon compound to increase the molecular weight by forming temporary links between ends of polymer chains. Exposure of the spun fibers to moisture, even the normal exposure of fibers to atmospheric humidity which occurs in fiber-manufacturing operations, causes hydrolysis of the oxysilicon linkages with resultant reduction of the molecular weight to give fibers of low relative viscosity.

Production of fibers having low relative viscosity gives the fiber producer a control over the pilling resistance that provides for improved uniformity of performance in the final fabric but sacrifices strength and abrasion resistance which are desirable during processing of staple into yarn and then into fabric. Weakness of the fibers during processing is a serious problem in producing knit fabrics. Fabrics knit from polyester staple, when compared with woven fabrics, have been found to have a magnified pilling problem because of the looseness of the knit structure, and prior art solutions to the pilling problem have not been fully satisfactory. Thus fibers eminently suitable for worsted fabrics are not at all suitable for knit fabrics. Knit fabrics require polyester staple fibers in a very low molecular weight range if they are to exhibit significant pilling resistance, and polyesters spun with molecular weights in this low range have been found to give weak fibers with accompanying operability problems in preparing and handling fine count yarns. The present invention overcomes this problem.

SUMMARY OF THE INVENTION

The invention is an improvement in the process of preparing a linear glycol terephthalate polyester and fabricating the polyester into filaments of 15 to 26 relative viscosity for preparing staple fiber yarns for knitting into fabric. In accordance with the present invention, pilling resistance in the knitted fabric is improved by modifying the polyester to contain —CH₂—S—CH₂— or

linking units in molecular chains of the polyester, each of the indicated nitrogen bonds being attached to a hydrocarbon group, melt-spinning the modified polyester into filaments of 15 to 26 relative viscosity, and subsequently treating the modified polyester with hypochlorous acid to reduce the relative viscosity to a value within the range of 8 to 12.5.

The hypochlorous acid treatment can be conducted to cleave molecular chains at CH₂—S or CH₂—N linkages without appreciably affecting the remainder of the polyester molecule. Hence, the mole percent of sulfur or nitrogen linking units in the modified polyester will provide a precise control of the amount of reduction in relative viscosity which is obtained in the treatment with hypochlorous acid. The amount of modifier needed will depend upon the relative viscosity of the polyester and the proportion of scissionable linkages of the modifier which are in the molecular chain of the polyester molecule. In general, when the mole percent sulfur or nitrogen times the ratio of the number of CH₂—S or CH₂—N links in the molecular chain to the total number of CH₂—S or CH₂—N links has a value within limits defined as follows:

0.3 to 1.7 for 15 relative viscosity
0.6 to 2.0 for 17.5 relative viscosity
0.7 to 2.2 for 20 relative viscosity
1.0 to 2.5 for 26 relative viscosity, treatment with hypochlorous acid will reduce the relative viscosity to a value within the range of 8 to 12.5. The mole percent to use at other relative viscosities, such as a relative viscosity of 23, can be obtained by interpolation between the values given.

The glycol terephthalate polyester will usually be an ethylene terephthalate polymer, although glycols such as trimethylene glycol, tetramethylene glycol and hexahydro-p-xylylene glycol may also be used. The polyester may be a copolymer, preferably of ethylene terephthalate/adipate or ethylene terephthalate/glutarate comprising at least 85 mole percent ethylene terephthalate units.

Illustrative of preferred modifiers for the polyester are 3,3'- or 4,4'-dicarboxytribenzylamine, thiodiglycolic acid, N,N'-dimethyl-N,N'-dibenzylethylenediamine-4,4'-dicarboxylic acid, N,N'-dimethyl-N,N'-bis(4-carboxylphenyl)-1,3-xylylenediamine and an ethylene oxide condensate of 1-(2-hydroxyethyl)-2,2,6,6-tetramethyl-4-hydroxypiperidine.

The filaments of modified polyester are particularly useful for preparing knitted fabrics of spun staple yarns. The filaments are drawn and cut to staple, the staple fibers are spun into yarn which is knitted into fabric, and the fabric is treated with hypochlorous acid as a final processing step so that good strength and abrasion resistance is provided during the previous steps. Development of pilling resistance can be precisely controlled during fabric finishing since the reduction in relative viscosity obtained is limited by the characteristic built into the modified polyester. The finishing mill thereby avoids any danger of ruining products which has been present in previous methods of treating unmodified polyester yarns to provide pilling resistance.

DETAILED DESCRIPTION

Attempts have been made to introduce amine dyesites in polyester chains. A variety of compounds having two ester-forming groups are known which can be copolymerized with polyesters for this purpose. Difficulties with these compounds have been that the modified polyesters have lacked stability, or the dyesites have not been sufficiently receptive to dyes, or the dyesites have not provided adequate dye-fastness in normal fabric use. However, any of those compounds which are tertiary amines having the nitrogen bonds attached to hydrocarbon groups, and which will provide a

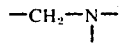

linkage in the polymer chain, may be used as modifiers for the purpose of the present invention. The modified polyesters have sufficient stability for processing into fabric and the polyester chain is readily cleaved at $CH_2$—N links to provide improved pilling resistance in the fabric.

An ester-forming group may be hydroxyl or carboxyl. The carboxyl group may be esterified with an alcohol which is volatile under polymerization conditions.

The polyester can also be modified with a compound containing an aliphatic sulfide linkage and having two ester-forming groups in positions such that the aliphatic sulfide linkage becomes a part of the main polymer chain. A preferred modifier of this type is thiodiglycolic acid or its ester-forming derivatives. Other suitable thioether compounds include thiodiethanol and 3,3'-thiodipropionic acid.

The modifier is incorporated in the polyester in conventional manner. It will usually be desirable to add the modifier near the end of the polyester polymerization. The modified polyester should be polymerized to provide filaments of 15 to 26 relative viscosity. Filaments having a relative viscosity of less than about 15 usually lack sufficient strength and toughness for normal textile processing, such as preparation and knitting of fine count yarns. Copolymers having a relative viscosity much above 26 are subject to difficulties in polymerization and melt-spinning which make them unattractive to the fiber producer.

The amount of modifier incorporated in the polyester is dependent upon the relative viscosity of the modified polyester in the as-spun filaments and the relative viscosity desired after the chain-scission treatment. For knit fabrics, the relative viscosity desired for pilling resistance in the fabric after finishing treatment is in the range of 8 to 12.5. Representative amounts of modifier needed, in effective mole percent of sulfur or nitrogen, are as follows:

0.3 to 1.7 for 15 relative viscosity
0.6 to 2.0 for 17.5 relative viscosity
0.7 to 2.2 for 20 relative viscosity
1.0 to 2.5 for 26 relative viscosity Values for other relative viscosities can be determined by interpolation from the values given.

The term "effective mole percent" is used to adjust for reactions which do not provide chain scission. For example, in a modified polyester in which the scissionable site is provided by a dicarboxytribenzylamine modifier, there are three $CH_2$—N bonds but only two of them are in the main polymer chain and only one of the three will be attacked and split by the treatment with hypochlorous acid. Accordingly, the actual mole percent nitrogen present in the modified polyester is multiplied by ⅔, the ratio of the number of $CH_2$—N links in the chain to the total number of $CH_2$—N links, to obtain the effective mole percent. More specifically, a polyester modified with 3,3'-tribenzylaminedicarboxylic acid to contain 3 mol percent nitrogen would contain an effective mole percent of 2 for purposes of this invention. On the other hand, modified polyesters wherein all of the $CH_2$—N or $CH_2$—S links are in the main polymer chain would have an effective mole percent nitrogen or sulfur which is the same as the actual mole percent present.

The modified polyester is preferably treated with an aqueous solution of hypochlorous acid to reduce the relative viscosity to a value within the range of 8 to 11. Although other reagents can be used, treatment with hypochlorous acid is the simplest and least expensive. The treatment solution is conveniently prepared from a commercial NaOCl solution and a buffer, e.g., as described in Example I. The solution is preferably buffered to about 5 pH. Sufficient water is used to completely wet out the yarn or fabric, as in a dyeing operation, and enough NaOCl and buffer are added to give the desired polymer scission. For complete scission of polyesters modified with tertiary amines, at least 5 moles of HOCl are needed for each mole of amine, and the yarn or fabric is treated for 30 to 60 minutes at 70° to 100° C. For polyesters modified with thioethers, as much as 15–17 moles of HOCl per mole of sulfur may be needed, and the yarn or fabric is treated for 60 minutes at 95° to 100° C.

TEST METHODS

Relative Viscosity ($RV_H$) is the ratio of the viscosity of a solution of 0.8 grams of polyester, dissolved at room temperature in 10 milliliters of hexafluoroisopropanol containing 80 parts per million of $H_2SO_4$, to the viscosity of the $H_2SO_4$-containing hexafluoroisopropanol itself, both measured at 25° C. in a capillary viscometer and expressed in the same units.

Values of relative viscosity measured in hexafluoroisopropanol can be converted to values of relative viscosity measured in "Fomal" (a phenol/trichlorophenol mixture used in many earlier patents) by the equation $1.28 RV_H = RV_F$. The subscripts H and F refer to hexafluoroisopropanol and Fomal, respectively.

Fabric Pilling is measured by ASTM method D-1375, using the Random Tumble Pill Test (RTPT). RTPT values are evaluated on a 0 to 5 scale where 0 indicates severe pilling and 5 indicates no pilling. A −1 value indicates extremely bad pilling.

Tenacity (T), percent elongation (E) and initial modulus (Mi) are measured on an Instron Tensile Tester at 25° C., using a constant rate of elongation of 60 percent per minute. $T_o$ is tenacity referred to denier at break, i.e., $T_o = (1 + E/100)T$.

Fiber Toughness values are determined by measuring the area under the load-elongation curve obtained in the above Instron test for tenacity.

Flex Life is measured by repeatedly pulling a single filament back and forth around a right angle silicon carbide edge having a radius of curvature of 0.001 inch (.025 mm.). The data in the examples were obtained at room temperature using a Satec Flex Tester manufactured by Satec Corporation of Grove City, Pa. The Tester provides two parallel horizontal bars, at the same level, with the test filaments attached to one bar and draped over the carbide edge of the other bar. Weights are attached to the free-hanging ends of the filaments. A weight of 1 gram is used for filaments having a denier less than 2.25, and 2 grams for filaments having a denier greater than 2.25. With ten single filament samples in place, one bar is moved horizontally, away from the other bar, for a distance of 0.5 inch (1.27 cm.) and then back again, causing the filament to move back and forth around the right angle edge. This cycle is repeated at the rate of 100 cycles per minute until all of the filaments have broken. The reported flex life is the average number of cycles-to-break for the 10 samples.

Lea product, used as a measure of the breaking strength of spun yarns, is the product of Scott skein breaking load in pounds times the cotton count; it is measured by ASTM Test Method D-1578-67.

Spun yarn evenness is evaluated from measurements of the linear density, using the percent coefficient of variation (% CV). The coefficient of variation is defined as the square root of the average of the squares of the deviations of the linear density measurements from the average linear density within the tested length of yarn.

EXAMPLE I

This example illustrates the preparation of polyester staple with latent pilling resistance using a tertiary amine group as the chain scissionable site.

PREPARATION OF 3,3'-DICARBOXYTRIBENZYLAMINE

A convenient method for the preparation of 3,3'-dicarboxytribenzylamine involves the bromination of m-tolunitrile to give 3-cyanobenzyl bromide, condensation of 2 moles of 3-cyanobenzyl bromide with benzylamine and then hydrolysis of the condensation product to give 3,3'-dicarboxytribenzylamine.

In one specific preparation, 352 grams of m-tolunitrile are brominated in 1,500 ml. of refluxing carbon tetrachloride with 500 grams of N-bromosuccinimide in the presence of 4 grams of benzoyl peroxide. After stirring and refluxing 1.5 hours, an additional 3 grams of benzoyl peroxide are added and the mixture refluxed another 2 hours. The solution is cooled to 50° C., filtered and the volatile materials removed under vacuum. The product is dissolved in a mixture of 850 ml. heptane and 500 ml. toluene, cooled to a temperature below 0° C. for several days, filtered, dried and distilled, at 125° C. under a pressure of 1 mm. The product is 415 grams of impure 3-cyanobenzylbromide having a melting point of 90° C.

A mixture of 78.4 grams (0.40 mole) of 3-cyanobenzylbromide with 21.44 grams (0.20 mole) of benzylamine and 51.72 grams of diisopropylethylamine in methylene chloride is stirred and refluxed overnight. After washing the mixture three times with 100 ml. of water, the methylene chloride is removed under vacuum, 400 ml. of concentrated hydrochloric acid is added and the mixture stirred and refluxed overnight. The product of the acid hydrolysis is filtered, dissolved in aqueous sodium hydroxide and the solution nearly saturated with 250 grams of sodium chloride. The precipitated sodium salt is collected, dissolved in a mixture of 200 ml. of water and 200 ml. of methanol and acidified hot with 50 ml. of acetic acid. The product is 20.3 grams of a solid melting at 184° C. When purified by recrystallizing from a mixture of xylene and acetic acid, the product has a sharp melting point at 180°–182° C. A comparison of the elemental analysis with that calculated for 3,3'-dicarboxytribenzylamine is as follows: calculated for $C_{23}H_{21}O_4N$: C, 73.51; H, 5.61; N, 3.71 Found: C, 73.61, 73.85; H, 5.21, 5.85; N, 3.71, 3.75.

POLYMER PREPARATION AND TESTING

Using known polyester batch polymerization procedures, dimethyl terephthalate and ethylene glycol are reacted by ester interchange and the resulting monomer is melt polymerized in the presence of 3,3'-tribenzylaminedicarboxylic acid to give a copolymer containing the tribenzylamine moiety in the polymer molecule. Manganous acetate and antimony oxide are used as catalysts. Polymers containing two different concentration levels of the tribenzylamine unit are prepared: polymer A contains 2.0 mol % of the amine unit and polymer B contains 3.0 mol % of the amine unit.

Each of the above polymers A and B are extruded, quenched, cut to flake, blended, dried and then re-melted and melt spun using known procedures. The melt-spun filaments are drawn in tow form, relaxed at 140° C., and then cut into 3-inch staple having the properties shown in Table I. For comparison, the properties of two commercial polyester fibers are also shown in the Table; Fiber C is a "normal viscosity" polyester staple which has a severe pilling problem in knit fabrics, and Fiber D is a "low viscosity" commercial polyester staple which gives knit fabrics with improved pilling properties but offers problems in processing because of its low strength.

TABLE I

|  | Staple Fiber Properties | | | |
|---|---|---|---|---|
|  | Fiber A | Fiber B | Fiber C | Fiber D |
| $RV_u$ | 17.7 | 20.2 | 21.4 | 8.8 |
| dpf | 2.43 | 2.85 | 3.22 | 3.21 |
| Mi, gpd | 44 | 41 | 28 | 49 |
| Ten., gpd | 3.8 | 3.7 | 3.7 | 2.6 |
| Elong., % | 35.9 | 42.3 | 30.6 | 39.6 |
| $T_o$, gpd | 5.2 | 5.3 | 4.8 | 3.7 |
| Toughness | 0.85 | 0.94 | 0.64 | 0.79 |
| Flex life, cycles | 1020 | 1490 | 5060 | 140 |

TABLE I-continued

| Staple Fiber Properties | | | | |
|---|---|---|---|---|
| | Fiber A | Fiber B | Fiber C | Fiber D |
| Shrinkage at 195° C | 16.9 | 17.2 | 7.1 | 2.9 |

The staple fibers in Table I are spun into yarns on the worsted system. Both 18.5/1 and 30/1 cotton count yarns are prepared. Examination of the uniformity and strength of the yarns gives the results shown in Table II. It is observed that the strengths of yarns A and B are comparable to that of the normal viscosity Fiber C commercial staple and much superior to the strength of the yarns prepared from Fiber D.

TABLE II

| Spun Yarn Properties | | | | |
|---|---|---|---|---|
| | Fiber A | Fiber B | Fiber C | Fiber D |
| $RV_{II}$ | 16.9 | 20.0 | 20.3 | 8.4 |
| 30/1 cc | | | | |
| % CV | 20.6 | 21.3 | 20.6 | 19.2 |
| Lea Product | 2980 | 2860 | 3200 | 1950 |
| 18.5/1 cc | | | | |
| % CV | 19.9 | 19.1 | 19.5 | 18.7 |
| Lea Product | 3560 | 3340 | 3750 | 2370 |

The 18.5/1 cc. yarns are knit into Jersey tubing on a Lawson knitting machine and the 30/1 cc. yarns are knit into a Ponti di Roma doubleknit fabric. It is observed that the yarn from Fiber D gives difficulty in knitting, resulting in some holes in the fabric.

All the fabrics are first scoured with a normal fabric scour. Then doubleknit test fabrics A and B are subjected to a hypochlorous acid bleach in a 40/1 aqueous bleach bath containing 0.81 ml. "Clorox" (5.25% active NaOCl) per gram of fabric and 2.4 ml. buffer solution per gram of fabric. The buffer solution is prepared by dissolving in water 40 grams per liter of $NaH_2PO_4.H_2O$, 15 grams per liter $Na_2SO_4.10H_2O$, 20 grams per liter $NaNO_3$ and 0.25 ml. per liter of an alkylaryl-polyether alcohol surfactant (Triton X-100, sold by Rohm & Haas). In the bleaching operation, the fabric is entered, the bath temperature is raised to 80° C. and held there for 45 minutes, then the bath is dropped and the fabric is rinsed.

Following the bleaching treatment, the doubleknit fabrics are given an antichlor treatment using a bath containing 4.0 ml. of antichlor solution per gram of fabric. The antichlor solution is made up by dissolving in water 15 grams per liter of $NaHSO_3$, 5 grams per liter of $Na_2SO_4.10H_2O$, 6.5 ml. per liter of 90% formic acid and 0.5 gram per liter of a sodium alkylethersulfate surfactant (Dupanol RA, sold by Du Pont). The fabric is immersed in the bath; the bath is heated to 80° C. and held for 30 minutes; and then the fabric is removed from the bath. Following the antichlor treatment, the test fabrics are dyed with dispersed dyes to a blue-black color, scoured, and then heat-set at 300° F. (149° C.) for 30 seconds to a 60 inch (1.52 meters) open width. The comparison fabrics containing Fiber C and Fiber D are scoured, dyed, scoured, and heat-set in the same manner but are not subjected to the bleach and antichlor treatments.

The Jersey fabrics from test fibers A and B are finished by scouring and then heat setting at 170° C. for 2 minutes while allowing a 10% shrinkage in width. The fabric pieces are then treated individually in a bleach bath at a bath-to-fabric ratio of 40/1 with sodium hypochlorite added to give the concentrations shown in Table IV. The baths are made up by diluting commercial "Clorox" containing 5.25 weight percent of NaOCl and adjusting the pH of the solution to about 5 with buffer solution.

The treated fabric samples are tested for pilling in the random tumble pilling test (RTPT) with the results shown in Tables III and IV. RTPT values are on a 0.5 scale where 0 indicates severe pilling and 5 indicates no pilling. Other fiber properties measured on fibers removed from the fabric after the HOCl treatment, are included in the Tables. Inspection of the data reveals that the HOCl treatment has provided a sharp reduction in polymer molecular weight and that the pilling performance of fabrics from Fibers A and B is more like the low viscosity Fiber D than the normal viscosity Fiber C.

TABLE III

| Properties of Doubleknit Fabric After Finishing | | | | |
|---|---|---|---|---|
| | Fiber A | Fiber B | Fiber C | Fiber D |
| $RV_{II}$ | 11.6 | 12.6 | 19.0 | 8.5 |
| Ten., gpd | 2.1 | 1.5 | 2.9 | 1.3 |
| Elong., % | 24.0 | 23.8 | 28.5 | 15.0 |
| $T_o$, gpd | 2.6 | 1.8 | 3.7 | 1.5 |
| Toughness | 0.29 | 0.21 | 0.38 | 0.12 |
| Pilling (RTPT) | | | | |
| 3 min. | 4.2 | 4.0 | 3.9 | 4.4 |
| 5 min. | 3.2 | 3.0 | 2.2 | 2.9 |
| 10 min. | −1.0 | 1.3 | −1 | 1.0 |
| 30 min. | 1.5 | 2.0 | −1 | 1.0 |

TABLE IV

| | | Properties of Jersey Knit Fabrics | | | | | | |
|---|---|---|---|---|---|---|---|---|
| Sample | Moles HOCl Per Mole N | Ten. gpd | Elong % | To gpd | $RV_{II}$ | Pilling (RTPT) Results | | |
| | | | | | | 1 min | 10 min | 30 min |
| Fiber A | 0 | 2.4 | 34.2 | 3.2 | 16.9 | 4.5 | 0 | 0 |
| | 5.2 | 1.4 | 22.2 | 1.7 | 9.5 | 2.5 | −0.7 | 2.5 |
| Fiber B | 0 | 2.1 | 34.1 | 2.8 | 20.0 | 4.0 | 0 | 0 |
| | 5.6 | 1.2 | 21.0 | 1.5 | 8.3 | 4.7 | 3.0 | 4.9 |
| Fiber C | 0 | 2.6 | 31.5 | 3.5 | 20.3 | 4.5 | 0 | 0 |
| | Bleached | 2.5 | 31.8 | 3.3 | 16.5 | 4.5 | 1.0 | 0 |
| Fiber D | 0 | 1.3 | 15.8 | 1.5 | 8.4 | 4.1 | 0 | 2 |
| | Bleached | 1.2 | 14.9 | 1.4 | 8.0 | 4.5 | 1.0 | 3.2 |

EXAMPLE II

This example illustrates the invention with a copolyester in which the chain scission site is an aliphatic sulfide group.

Using known polyester batch polymerization procedures, dimethyl terephthalate and ethylene glycol are reacted by ester exchange and the resulting monomer is melt polymerized in the presence of thiodiglycolic acid or thiodiglycolic acid plus adipic acid to give copolyesters containing thiodiglycolic acid in the polymer molecule. A comparison polymer is similarly prepared using diglycolic acid in place of thiodiglycolic acid. Manganous acetate and antimony oxide are used as catalysts for the exchange and polymerization reactions. The copolyesters produced have the following concentrations of the added copolymeric component:

| Polymer Code | Copolymeric Modifier (Mol %) | | |
|---|---|---|---|
| | Thiodiglycolic Acid | Adipic Acid | Diglycolic Acid |
| A | 1.4 | 0 | 0 |
| B | 1.7 | 0 | 0 |
| C | 1.8 | 2.4 | 0 |
| D | 0 | 0 | 2.5 |

Each of the above polymers is extruded from the polymerization vessel, quenched, cut to flake, dried and then remelted and melt spun using well-known procedures. The yarn spun from these polymers is drawn over a hot plate at a temperature of 90°–97° C. A sample of each of these drawn yarns is subjected to boiling water for 2 hours in a relaxed condition and the properties measured as shown in Table V. Another sample of each of these drawn yarns is treated for 2 hours at 100° C. in an aqueous bath containing 1.0 milliliters of "Clorox" bleach (5.25% sodium hypochlorite) per gram of yarn, and buffered to about pH 5 with a buffer solution. Measured properties of these yarns are also presented in Table V. Inspection of the data in the table reveals that only the polymers containing the sulfide linkage units are cleaved by the hypochlorous acid treatment to give the reduction in strength and toughness necessary for improved pilling resistance.

TABLE V

| | FIBER PROPERTIES | | | |
|---|---|---|---|---|
| | Polymer A Fiber | Polymer B Fiber | Polymer C Fiber | Polymer D Fiber |
| Original Boiled-Off Properties | | | | |
| $RV_{\eta}$ | 16.2 | 16.4 | 19.3 | 17.6 |
| Toughness | 1.00 | .88 | 1.16 | 1.12 |
| Tenacity, gpd ($T_a$) | 5.7 | 5.8 | 5.9 | 5.7 |
| Properties after HOCl Treatment | | | | |
| $RV_{\eta}$ | 8.2 | 8.8 | 8.6 | 16.7 |
| Toughness | .21 | .25 | .23 | 1.31 |
| Tenacity, gpd ($T_a$) | 2.8 | 2.7 | 2.6 | 5.8 |
| Change in Properties | | | | |
| Toughness | −79 % | −72 % | −80 % | +16 % |
| Tenacity, gpd ($T_a$) | −50 % | −53 % | −55 % | +3 % |

EXAMPLE III

This example illustrates an embodiment of the invention in which the copolyester modifier units contain 2 tertiary amine groups per unit.

SYNTHESIS OF
N,N'-DIMETHYL-N,N'-DIBENZYL-
ETHYLENEDIAMINE-4,4'-DICARBOXYLIC ACID
(AMINE A)

To a refluxing solution of 92 grams 4-carbomethoxybenzylbromide in 150 milliliters methylene chloride is added a solution of 17.6 grams N,N'-dimethylenediamine and 52 grams diisopropylethylamine in 150 ml. methylene chloride. After refluxing 5 hours, the cooled reaction mixture is extracted with four 100 ml. portions of water. The methylene chloride is then removed by distillation. The residue is treated with 35 grams potassium hydroxide and 250 ml. ethanol at reflux for 30 minutes; 50 ml. water is then added and refluxing is continued for 3 hours. The reaction mixture is taken up in 300 ml. hot water, decolorized with activated carbon, filtered, and the dihydrohalide salt precipitated by addition of concentrated hydrochloric acid. The dried precipitate is twice dissolved in aqueous potassium hydroxide and reprecipitated by cooling after acidification with acetic acid. The product has a melting point of 266° C. and is found to have 7.69% nitrogen by analysis.

POLYMER PREPARATION AND TESTING

A copolymer of polyethylene terephthalate modified with the amine prepared above (amine A), is prepared in glass apparatus by heating 130.9 grams dihydroxyethylterephthalate and the amine to a temperature of 280°–290° C. for approximately 6 hours under a high vacuum. Antimony oxide is used as a catalyst. The polymer is cooled and separated from the glass apparatus, broken up, ground to a powder and dried. Sufficient amine is added so that polymer A contains 1.3 mol % of amine A.

The polymer is melt spun through a five-hole spinneret in a press spinner using known procedures. The yarn produced is drawn over a hot plate at a temperature of 94° C.

A comparison yarn is made from polymer C, which is prepared according to the general procedure of Example I, adjusted to give a polyethylene terephthalate copolymer containing 2.6 mol % of 3,3'-tribenzylamine dicarboxylic acid. Polymer C is similarly press spun and drawn.

Portions of the yarns produced are treated for 2 hours at the boil in an aqueous bath adjusted to pH 5 and containing 10 moles of hypochlorous acid per mole of amine nitrogen in the fiber sample. Measured properties of the treated yarns are presented in Table VI. For comparison, other portions of the yarns are treated with boiling water for 2 hours and the same properties measured. The properties of these comparison yarns are labeled "Original Boiled-Off Properties" in the Table. An inspection of the data in the table reveals that all of these yarns spun from polymers containing tertiary amine groups are cleaved by the hypochlorous acid treatment to give fibers with reduced strength and toughness necessary for improved pilling resistance.

TABLE VI

| | FIBER PROPERTIES | |
|---|---|---|
| | Polymer A Fiber | Polymer C Fiber |
| Original Boiled Off Properties | | |
| $RV_{\eta}$ | 15.6 | 15.5 |
| Toughness | .52 | 1.06 |

TABLE VI-continued

| FIBER PROPERTIES | Polymer A Fiber | Polymer C Fiber |
|---|---|---|
| $T_o$, gpd | 3.4 | 4.7 |
| Properties after HOCl Treatment | | |
| $RV_{II}$ | 10.8 | 7.8 |
| Toughness | .34 | .33 |
| $T_o$, gpd | 2.9 | 2.7 |
| Change in Properties | | |
| Toughness | −35 % | −69 % |
| $T_o$, gpd | −13 % | −43 % |

EXAMPLE IV

This example illustrates an embodiment of the invention in which the polyester modifier unit is an ethylene oxide condensate of a tetramethylpiperidine glycol.

The modifier, 1-(2-hydroxyethyl)-2,2,6,6-tetramethyl-4-hydroxypiperidine condensed with ethylene oxide in a molar ratio of 1:19, is prepared as described in U.S. application Ser. No. 559,701, filed May 2, 1975. The modifier is melted and mixed with molten polyethylene terephthalate of low molecular weight, the mixture is polymerized at 278° C. under vacuum to about 20 relative viscosity, and the polymer is spun at 270° C. into filaments which are drawn in an aqueous draw bath at 70° C. using known procedures.

Samples of the above-prepared fiber containing 1.4 mol % modifier are treated with hypochlorous acid at two different concentration levels of HOCl, as indicated in Table VII (Samples B and C). The HOCl solutions are buffered to pH 5.5 and the samples are treated using a 40/1 bath ratio for 60 minutes on a steam bath. Each treated sample is given an antichlor treatment in dilute NaHSO₃ solution for 30 minutes on a steam bath, and then rinsed and dried in air. For comparison, a sample (A) of the same copolymer fiber is treated with plain water under similar temperature and time conditions. All the samples were then tested with the results shown in Table VII. The data in the table clearly show the controlled reduction in molecular weight and in tensile properties which is obtainable by the process of the invention. The reduction in flex life shown is indicative of the marked improvement in pill resistance obtainable when staple fiber fabrics are prepared in accordance with the principles of the invention.

The flex life data shown in the table is the average number of times a single filament can be repeatedly bent 180° around a 1 mil. (0.025 mm.) tungsten wire before breaking. In the test, 10 single filaments are simultaneously bent back and forth over the wire at room temperature under a load of 0.33 grams per denier using a flexing rate of about 155 cycles per minute. The number of cycles-to-break is recorded for each sample and the average of the 10 values is reported as "flex life."

TABLE VII

| Fiber Treatment and Test Results | A | B | C |
|---|---|---|---|
| Moles HOCl per Mole N | 0 | 5 | 10 |
| Polymer $RV_{II}$ after treatment | 17.7 | 9.9 | 8.7 |
| % Reaction (chain splitting) | 0 | 88 | 118 |
| Flex Life (cycles) | 5363 | 811 | 700 |
| % Loss in Flex Life | 0 | 85 | 87 |
| Tenacity, $T_o$, gpd | 5.72 | 3.72 | 3.19 |
| % Loss in Tenacity | 0 | 35 | 44 |

I claim:
1. In the process of preparing a linear glycol terephthalate polyester and fabricating the polyester into filaments of 15 to 26 relative viscosity for preparing staple fiber yarns for knitting into fabric, the method of improving pilling resistance in the knitted fabric which comprises modifying the polyester to contain —CH₂—S—CH₂— or

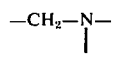

linking units in molecular chains of the polyester, each of the indicated nitrogen bonds being attached to a hydrocarbon group, fabricating the modified polyester into filaments wherein the mole percent sulfur or nitrogen times the ratio of the number of CH₂—S or CH₂—N links in the molecular chain to the total number of CH₂—S or CH₂—N links has a value within limits defined as follows:
   0.3 to 1.7 for 15 relative viscosity
   0.6 to 2.0 for 17.5 relative viscosity
   0.7 to 2.2 for 20 relative viscosity
   1.0 to 2.5 for 26 relative viscosity,
and subsequently treating the modified polyester with hypochlorous acid to reduce the relative viscosity to a value within the range of 8 to 12.5 said relative viscosity is the ratio of the viscosity of a solution of 0.8 grams of polyester, dissolved at room temperature in 10 milliliters of hexafluoroisopropanol containing 80 parts per million of H₂SO₄, to the viscosity of the H₂SO₄—containing hexafluoroisopropanol itself, both measured at 25° C. in a capillary viscometer and expressed in the same units.

2. The process defined in claim 1 wherein the polyester is an ethylene terephthalate polymer modified with 3,3′-dicarboxyltribenzylamine.

3. The process defined in claim 1 wherein the polyester is an ethylene terephthalate polymer modified with thiodiglycolic acid.

4. The process defined in claim 1 wherein the polyester is an ethylene terephthalate polymer modified with N,N′-dimethyl-N,N′-dibenzyl-ethylenediamine-4,4′-dicarboxylic acid.

5. The process defined in claim 1 wherein the polyester is an ethylene terephthalate polymer modified with an ethylene oxide condensate of 1-(2-hydroxyethyl)-2,2,6,6-tetramethyl-4-hydroxypiperidine.

6. The process defined in claim 1 wherein the modified polyester is treated with an aqueous solution of hypochlorous acid to reduce the relative viscosity to a value within the range of 8 to 11.

* * * * *